United States Patent [19]

Maeda

[11] 4,199,202

[45] Apr. 22, 1980

[54] BEARING STRUCTURE FOR A CAM SHAFT IN INTERNAL COMBUSTION ENGINES

[75] Inventor: Yorishige Maeda, Toyota, Japan

[73] Assignee: Toyota Jidosha Kogyo Kabushiki Kaisha, Japan

[21] Appl. No.: 931,446

[22] Filed: Aug. 7, 1978

Related U.S. Application Data

[63] Continuation of Ser. No. 740,881, Nov. 11, 1976, abandoned.

[30] Foreign Application Priority Data

Aug. 20, 1976 [JP] Japan .................................. 51-100047

[51] Int. Cl.² .......................... F16C 3/14; F01M 1/04
[52] U.S. Cl. .......................................... 308/23; 74/605; 123/196 R; 184/6.5; 308/74; 308/78
[58] Field of Search .................. 308/23, 74, 78, 87 R, 308/167, 179; 184/6.5; 123/196 R; 74/605

[56] References Cited

U.S. PATENT DOCUMENTS

| | | | |
|---|---|---|---|
| 1,299,555 | 4/1919 | Cosgray | 308/23 |
| 3,089,735 | 5/1963 | Mann | 308/23 |
| 3,908,798 | 9/1975 | Binder | 123/196 R |
| 3,965,880 | 6/1976 | Michael | 123/196 R |

*Primary Examiner*—Charles E. Frankfort
*Attorney, Agent, or Firm*—Stevens, Davis, Miller & Mosher

[57] ABSTRACT

A bearing structure for a cam shaft has a first journal-receiving cavity of a semi-circular cross section provided in an upper face of a cylinder head, and a second journal-receiving cavity of a semi-circular section provided in a lower face of a bearing cap. The bearing cap is mounted on the cylinder head with the two faces joining together. A groove is provided in at least one of the two joining faces to extend across that face and to communicate at one end thereof with the internal space of the cylinder head so as to collect or intercept oil leaking out through a clearance left between the two adjacent faces.

6 Claims, 7 Drawing Figures

BEARING STRUCTURE FOR A CAM SHAFT IN INTERNAL COMBUSTION ENGINES

This is a continuation of application Ser. No. 740,881 filed Nov. 11, 1976, now abandoned.

BACKGROUND OF THE INVENTION

1. Field of the Invention

The present invention relates to a bearing structure for a cam shaft in internal combustion engines and, more particularly, a bearing structure for a cam shaft which is driven by a timing belt.

2. Description of the Prior Art

In overhead cam engines, the cam shaft is conventionally mounted in the engine so that its bearing portion is laid in a semi-circular journal-receiving cavity in an upper face of the cylinder head. A bearing cap, having a second semi-circular journal-receiving cavity provided in a lower face thereof, is mounted with the second cavity opposing the first mentioned cavity in the cylinder head, thereby enabling the bearing portion of the cam shaft to be rotatable in the round bearing cavity defined by said first and second semi-circular cavities. The bearing surface of this structure is generally formed with an annular oil groove which is supplied with oil under a pressure such as 2 $Kg/cm^2$–4 $Kg/cm^2$ in normal operation and 6 $Kg/cm^2$ when starting-up at a low temperature. The oil is generally supplied through a passage which opens into the bearing surface provided by the cylinder head. When the cam shaft supported by this bearing structure is driven by gear wheels or an endless chain, the driving means are located within the body of the engine and no problem arises even if the lubricating oil leaks out either from the front or rear of the bearing portion because the oil is positively received and collected in an oil pan provided at a lower portion of the engine. However, in those engines where the cam shaft is driven by a timing belt, the cam shaft has a front end portion which projects forward from the body of the engine and supports a pulley on which is mounted a timing belt. The latter also runs around another pulley mounted on the crank shaft of the engine and, because of this, the oil can no longer be collected if it has leaked out forward from the bearing portion.

To meet this problem, the conventional bearing structure for a cam shaft driven by a timing belt generally incorporates oil seal means provided between the front end portion of the bearing surface and the journal portion of the cam shaft so as to check and collect any oil leaked out from the bearing portion and to return the oil to the internal space of a cylinder head through an oil return passage which connects the oil seal means and said internal space. However, the lubricating oil pumped to the bearing under pressure can enter the very small clearance left between the upper face of the cylinder head and the lower face of the bearing cap and ooze out from the space between the cylinder head and the bearing cap. It has been suggested to have the adjacent faces conact each other more accurately and closely in order to prevent such an oil leakage. However it is practically impossible to finish the joining surfaces to such high accuracy as to perfectly exclude any entry of the pressurised lubricating oil between adjacent faces. As an alternative measure to meet this problem, it has been suggested to provide an oil seal between the joining faces. However, this is difficult to accomplish in practice in view of the function and structure of the bearing portion. In addition, this would result in a higher engine cost.

SUMMARY OF THE INVENTION

It is therefore the object of the present invention to solve the aforementioned problem of oil leakage in the bearing structure for a cam shaft which is driven by a timing belt and to provide an improved bearing structure for the cam shaft which is capable of positively eliminating the oil leakage therefrom.

According to the present invention, the above object is achieved by a bearing structure for a cam shaft which comprises a cylinder head having a first semi-circular journal-receiving cavity provided in an upper face thereof, a bearing cap, having a second, semi-circular journal-receiving cavity provided in a lower face thereof, said upper face of the cylinder head joining said lower face of said bearing cap when said bearing cap is mounted on said cylinder head. A groove is provided in at least one of the adjoining faces to extend across a face and to communicate at one end thereof with the internal space of the cylinder head.

In the above-mentioned bearing structure, the groove traverses the bordering surface defined between the two surfaces which join the cylinder head and bearing cap and serves to collect any oil which crosses the groove when flowing over the bordering surface from an inside to an outside region threof. The oil thus collected is returned through the groove to the internal space of the cylinder head, thereby positively preventing any oil from leaking out of the cylinder head or the body of the engine.

Since the bearing structure of the aforementioned type further incorporates an annular oil seal element provided adjacent the outside edge of the bearing surface defined by said journal-receiving cavities, and this annular seal slidably contacts an annular surface portion of the cam shaft located adjacent its journal portion, it is desirable that the groove start from an inside edge portion of the annular seal element and traverse the joining border surface toward the other end which opens into the internal space of the cylinder head. This groove must, of course, be located away from the oil supply port which opens into the bearing surface defined by the cavity portions of the cylinder head and the bearing cap.

BRIEF DESCRIPTION OF THE DRAWING

In the accompanying drawing.

DESCRIPTION OF THE PREFERRED EMBODIMENT

Figure 1:
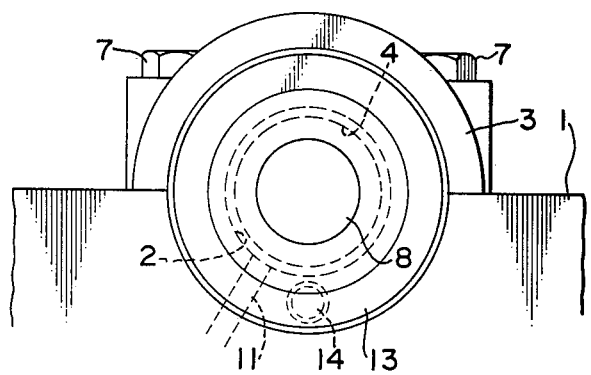
FIG. 1 is a front view of an embodiment of the bearing structure for a cam shaft according to the present invention.
Figure 2:
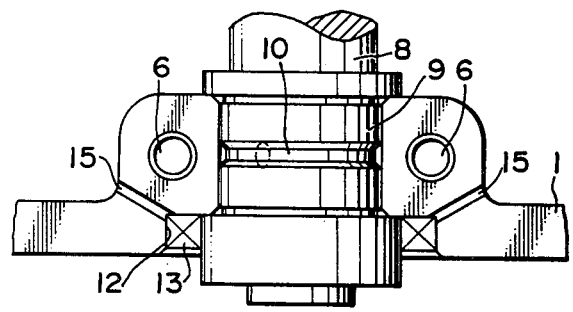
FIG. 2 is a plan view showing the upper face of the cylinder head which forms a part of the bearing structure shown in FIG. 1.
Figure 3:
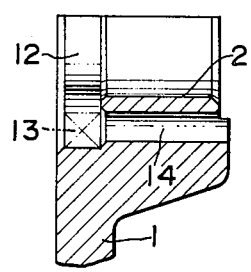
FIG. 3 is a vertical sectional view of the journal receiving cavity of the cylinder head.
Figure 4:
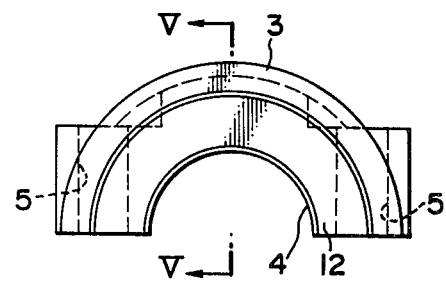
FIG. 4 is a front view of the bearing cap incorporated in the bearing structure shown in FIG. 1.
Figure 5:
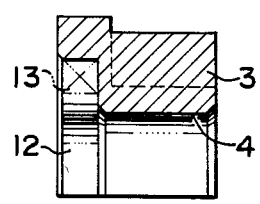
FIG. 5 is a sectional view along line V—V in FIG. 4.

In the following the invention will be described in detail with reference to the accompanying drawings. Referring to FIGS. 1-6, 1 designates the front wall of a cylinder head which has a semi-circular journal-receiving cavity 2 provided in its upper face. a cylinder cap 3 also having a semi-circular journal-receiving cavity 4 provided in a lower face thereof is mounted on the cylinder head in a manner such that the cavity 4 opposes the cavity 2, thereby together defining a round cavity rimmed by an annular bearing surface in which is received journal portion 9 of cam shaft 8. The bearing cap is clamped to the cylinder head by two bolts 7 which are passed through openings 5 in the bearing cap and are screwed into threaded openings 6 in the cylinder head. The cam journal portion 9 is formed with an annular oil groove 10 at a middle portion thereof, while an oil supply port 11 opens into the bearing surface of the cylinder head to supply oil directly to the annular space defined by annular groove 10 and the bearing surface. Adjacent the journal-receiving cavities, the cylinder head and the bearing cap are formed with semi-circular cuttings of a larger diameter than the cavities, the cuttings together forming an annular groove 12 for receiving an annular seal element 13. Annular seal 13 is in sealing contact with an enlarged forward end portion of the cam shaft adjacent its journal portion 9. The bottom portion of the groove 12 communicates with the internal space of the cylinder head through an oil return passage 14 which traverses and extends through the bearing portion of the cylinder head, whereby the oil which has leaked out into the annular oil seal 13 is returned to the inside of the cylinder head through the passage 14.

The above description, to this point, relates to a conventional bearing structure. However, in accordance with the present invention, the embodiment shown in FIGS. 1-6 differs from the conventional structure by being provided with two grooves 15 which are formed in the upper face of the front wall 1 of the cylinder head. In more detail, the grooves 15 extend from opposite inside corners of the groove 12 toward the internal space of the cylinder head.

By this arrangement, even if the lubricating oil supplied to the bearing clearance formed between the bearing surface and the cam journal portion leaks out into the clearance space between the adjacent faces of the cylinder head and the bearing cap, the oil is intercepted by grooves 15 and cannot cross these grooves to further leak out through the clearance space to the outside of the cylinder. The oil trapped in grooves 15 is returned from there into the internal space of the cylinder head.

Figure 7:
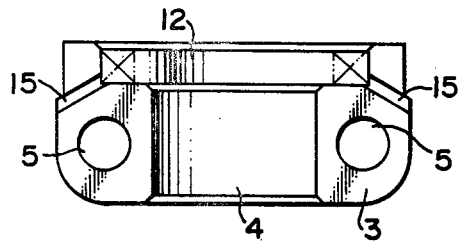
FIG. 7 is a plan view showing the lower face of the cylinder cap wherein another embodiment of the present invention is incorporated.
Figure 6:
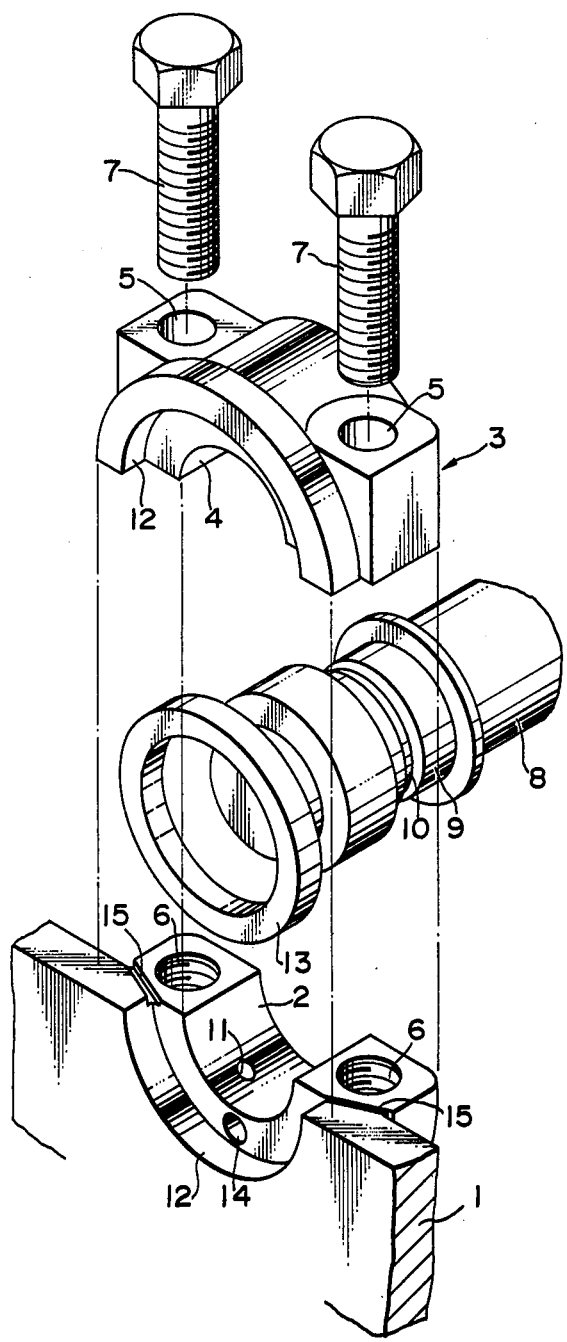
FIG. 6 is an exploded perspective view of the bearing structure shown in FIG. 1.

Grooves 15 need not necessarily be provided in the upper face of the cylinder head. They may, alternatively, be provided in the lower face of bearing cap 3, as shown in FIG. 7. Furthermore as a third embodiment the grooves may be formed in both the upper face of the cylinder head and the lower face of the bearing cap.

Although the invention has been described with reference to particular embodiments thereof, it will be understood by those skilled in the art that various modifications can be made in the illustrated embodiments without departing from the spirit of the invention.

I claim:

1. In a cam shaft bearing structure comprising a cylinder head having a vertical outer wall portion and a bearing portion on said wall portion, said wall and bearing portions having a continuous upper face, said bearing portion having a first semi-circular journal-receiving cavity; a bearing cap having a lower face to join said upper face of said bearing portion and a part of said upper face of said wall portion and a second semi-circular journal-receiving cavity which forms a circular bearing cavity together with said first semi-circular journal-receiving cavity when said bearing cap is mounted on said cylinder head, the improvement comprising means to facilitate return lubricating oil flow to the inside of said vertical outer wall portion by a direct route, to avoid oil flow between said upper and lower faces, said means comprising a groove in at least one of said joining faces which traverses that face so as to completely separate the interface between the upper face of said bearing portion of the cylinder head and the corresponding portion of the lower face of the bearing cap from the interface between the mutually contacting upper face of said wall portion of the cylinder head and the corresponding portion of the lower face of the bearing cap, said groove opening at one end thereof to the inside of said vertical outer wall portion.

2. The bearing structure of claim 1, wherein the groove is provided in the upper face of the cylinder head.

3. The bearing structure of claim 1, wherein the groove is provided in the lower face of the bearing cap.

4. The bearing structure of claim 1, wherein the groove is provided in both the upper face of the cylinder head and the lower face of the bearing cap.

5. The bearing structure of claim 1, further comprising an annular groove provided adjacent the outside of said first and second journal-receiving cavities and an annular oil seal element mounted in said annular groove, the groove provided in at least one of the two joining faces extends from an inner edge portion of said annular groove and extends toward the internal space of said cylinder head.

6. The bearing structure of claim 1, further comprising an oil supply port opening into the first or second journal-receiving cavity, and the groove provided in at least one of the joining faces is located away from said oil supply port.

* * * * *